(12) United States Patent
Iseri et al.

(10) Patent No.: US 12,318,782 B2
(45) Date of Patent: Jun. 3, 2025

(54) DEVICE FOR BIOASSAY AND METHODS FOR PREPARATION AND USE THEREOF

(71) Applicant: UTILIZER AB, Stockholm (SE)

(72) Inventors: Emre Iseri, Solna (SE); Wouter Van Der Wijngaart, Sollentuna (SE)

(73) Assignee: UTILIZER AB, Stockholm (SE)

( * ) Notice: Subject to any disclaimer, the term of this patent is extended or adjusted under 35 U.S.C. 154(b) by 783 days.

(21) Appl. No.: 16/959,074

(22) PCT Filed: Jan. 21, 2019

(86) PCT No.: PCT/EP2019/051371
§ 371 (c)(1),
(2) Date: Jun. 29, 2020

(87) PCT Pub. No.: WO2019/141844
PCT Pub. Date: Jul. 25, 2019

(65) Prior Publication Data
US 2020/0330978 A1    Oct. 22, 2020

(30) Foreign Application Priority Data
Jan. 19, 2018   (SE) .................................... 1830020-2

(51) Int. Cl.
*B01L 3/00*     (2006.01)
*B01J 19/00*    (2006.01)
*G01N 1/02*     (2006.01)

(52) U.S. Cl.
CPC ........... *B01L 3/508* (2013.01); *B01J 19/0046* (2013.01); *G01N 1/02* (2013.01);
(Continued)

(58) Field of Classification Search
CPC ................. B01L 3/508; B01L 3/50857; B01L 2300/069; B01L 2300/161; B01J 19/0046;
(Continued)

(56) References Cited

U.S. PATENT DOCUMENTS

| 6,183,970 B1 | 2/2001 | Okano et al. |
| 2002/0095073 A1 | 7/2002 | Jacobs et al. |

(Continued)

FOREIGN PATENT DOCUMENTS

| WO | WO 00/77261 A1 | 12/2000 |
| WO | WO 2005/105308 A1 | 11/2005 |
| WO | WO 2013/071297 A1 | 5/2013 |

OTHER PUBLICATIONS

Smith, Gennifer T., et al. "Robust dipstick urinalysis using a low-cost, micro-volume slipping manifold and mobile phone platform." Lab on a Chip 16.11 (2016): 2069-2078. (Year: 2016).*

(Continued)

*Primary Examiner* — Robert J Eom
(74) *Attorney, Agent, or Firm* — James S. Keddie; Bozicevic, Field & Francis LLP

(57) ABSTRACT

The present disclosure is directed to a device (100) comprising a sampling part (110), wherein the sampling part (110) comprises an array of capture zones (112) for sampling liquid volumes between tens of microliters and femtoliters, wherein some or all of the capture zones (112) contain a sponge-like material. Also disclosed are a method for the preparation of such a device and a method for the detection and determination of the presence, concentration and/or properties of an analyte by contacting a liquid sample with such a device.

22 Claims, 6 Drawing Sheets

(52) U.S. Cl.
CPC ........... *B01J 2219/00286* (2013.01); *B01J 2219/00317* (2013.01); *B01J 2219/00619* (2013.01); *B01J 2219/00644* (2013.01); *B01L 2300/069* (2013.01); *B01L 2300/161* (2013.01); *G01N 2001/028* (2013.01)

(58) Field of Classification Search
CPC .... B01J 2219/00286; B01J 2219/00317; B01J 2219/00619; B01J 2219/00644; G01N 1/02; G01N 2001/028
See application file for complete search history.

(56) References Cited

U.S. PATENT DOCUMENTS

| | | |
|---|---|---|
| 2010/0105040 A1 | 4/2010 | Lau et al. |
| 2011/0311417 A1 | 12/2011 | Li et al. |
| 2020/0330978 A1* | 10/2020 | Iseri ............. B01J 19/0046 |

OTHER PUBLICATIONS

ACON Laboratories, Inc, Mission Urinalysis Strips and Controls, (https://www.aconlabs.com/wp-content/uploads/2020/07/PN_2170004302_Mission-Urine-Strips-Control_12-2017.pdf), (2017), p. 1-4. (Year: 2017).*

* cited by examiner

DEVICE FOR BIOASSAY AND METHODS FOR PREPARATION AND USE THEREOF

CROSS-REFERENCE TO RELATED APPLICATIONS

This application is a § 371 national phase of International Application No. PCT/EP2019/051371, filed on Jan. 21, 2019, which claims the benefit of Swedish Patent Application No. 1830020-2, filed on Jan. 19, 2018, which applications are incorporated by reference herein.

FIELD OF THE DISCLOSURE

The present disclosure relates to the field of bioassays. More particularly, the present disclosure is directed to devices and methods for performing a bioassay, such as a digital bioassay, for digitization of liquid samples for statistical analysis, for diagnostics testing or for detection and determination of concentration of chemical or biological substances, e.g. bio-reagents or pathogens.

BACKGROUND OF THE DISCLOSURE

The World Health Organization (WHO) identifies antimicrobial resistance (AMR) as one of the biggest threats to modern healthcare. The rapidly increasing antibiotic resistance problem affects all parts of the world and global solutions to solve this problem are urgently needed [1]. According to the final report of UK government Review on Antimicrobial Resistance, promoting new and rapid diagnostics to cut unnecessary use of antibiotics forms a crucial step to solve this problem [2].

Urinary tract infections (UTIs) are one of the most common bacterial infections encountered by primary care physicians [3]. Due to the long turnaround time (TAT) of current UTI diagnostic tests, empiric treatment by antibiotics immediately after the examination is today's standard practice. Unnecessary antibiotic treatment of UTI increases the risk of developing antimicrobial resistance significantly. Considering the epidemiology of UTI, new point of care (PoC) diagnostic (Dx) tools for this condition form an appropriate approach to combat AMR.

The main shortcomings of today's PoCDx tools for UTI are their accuracy and TAT. Moreover, the tools should be cost effective to allow dissemination in healthcare settings with a restrained budget or in low resource settings. Microfluidics is attractive for PoC Dx testing [5] because the technology allows handling small amounts of sample and reagent, rapid reaction time and scalability. In the last two decades, advances in microfluidics have provided cutting edge technology for manipulation of nano-to-attolitre volumes of liquids [4].

Digital bioassays allow simple quantification, and therefore have potential for PoC diagnostics [6]. Examples of previous microfluidic platforms for sample digitization are listed hereunder.

Droplet microarrays formed on superhydrophilic-superhydrophobic patterned flat surfaces [7, 8] or structures [9, 10] are two examples of self-digitisation of sample without the need for external instrumentation. However, the rapid, uncomplicated, low cost and automated addition of detection reagents to the samples after digitization remains an unresolved challenge.

"Lab-on-a-stick" [11] shows a simple way to digitise samples through capillary filling in tubes. However, this format constitutes a rather bulky linear comb-like array of many tubes in which each capillary provides a non-digital readout, and which format prevents extending the approach towards the degree of digitisation needed in bioassays.

Slipchip [12] provides a simple way of digitisation to perform multiplex microfluidic reactions without the need for external pumps or valves. However, the method has not been shown for detection of bacteria without extensive off-chip sample preparation. Even though recently published slipchip-based antibiotic susceptibility tests (AST) provide very rapid results, the current approach is unable to give AST results for bacterial concentrations below $10^5$ CFU/ml [13].

Lab-on-CD (DVD) methods provide easy ways of manipulation of liquids with centrifugal forces to prepare sample [14] and a simple platform for optical readout [15]. However, the format still requires bulky hardware to operate, which limits the PoC applications.

The present disclosure addresses three specific hurdles in infectious disease diagnostics:
- Digital bioassays are powerful tools for the quantification of biomarkers, but typically require complicated lab instruments for the digitisation of the sample and the readout.
- Hands-on time and the requirement of trained personnel limit the uptake of the new technologies in the medical setting.
- Low resource settings require diagnostic formats that do not rely on complicated external equipment.

SUMMARY OF THE DISCLOSURE

The object of the present disclosure is to solve or at least mitigate the above-mentioned problems associated with infectious disease diagnostics. The present disclosure provides a method and a device that enable digitization of liquid samples for statistical analysis. More particularly, a novel device and methods are provided that can find application in diagnostics testing, as a tool in analytical chemistry, or for the detection and determination of the concentration of bioreagents or pathogens, such as microorganisms, nucleotides, or proteins, present in liquid samples. One embodiment of a device according to the present disclosure was designed based on requirements for UTI diagnostic tests, where bacterial concentrations down to $10^3$ CFU/ml are of interest, and where detection of $10^5$ CFU/ml is the concentration above which a patient is considered infected [16].

The present disclosure manages to bring the sensitivity and ease-of-use of previously known digital assays to a point-of-care format. In one preferred embodiment, a "dip-and-swipe" action can be used during the operation of the device, which "dip-and-swipe" action requires no technical skills from the end-user and requires a minimal hands-on-time. Further, in a preferred embodiment, the device operation does not require equipment for fluid actuation. In one preferred embodiment, readout of the device can be accomplished by the naked eye. In another preferred embodiment, readout of the device can be accomplished by a cell phone camera.

More particularly, the present disclosure is directed to a device comprising a sampling part, wherein the sampling part comprises an array of capture zones for sampling liquid volumes between tens of microliters and femtoliters, wherein some or all of the capture zones contain a sponge-like material.

Further, the present disclosure is directed to a method for the preparation of a device according to the present disclosure, comprising:

(i) providing a device comprising a sampling part, wherein the sampling part comprises an array of capture zones for sampling liquid volumes between tens of microliters and femtoliters;

(ii) synthesizing a sponge-like material in at least one of the capture zones.

The present disclosure is also directed to a method for the detection and determination of the presence, concentration and/or properties of an analyte, which is a chemical substance or a biological substance, such as a bio-reagent, or a living organism, such as a pathogen, a virus, or a bacterium, comprising:

(i) contacting a liquid sample with a device according to the present disclosure;

(ii) measuring or detecting the presence, concentration and/or properties of the analyte present in the liquid sample.

The present disclosure is further directed to use of a device according to the present disclosure for detection and determination of a presence, concentration and/or properties of an analyte, which is a chemical substance or a biological substance, such as a bio-reagent, or a living organism, such as a pathogen, a virus, or a bacterium.

Preferred embodiments of the present disclosure are set forth in the dependent claims.

DETAILED DESCRIPTION OF THE DISCLOSURE

Figure 1:
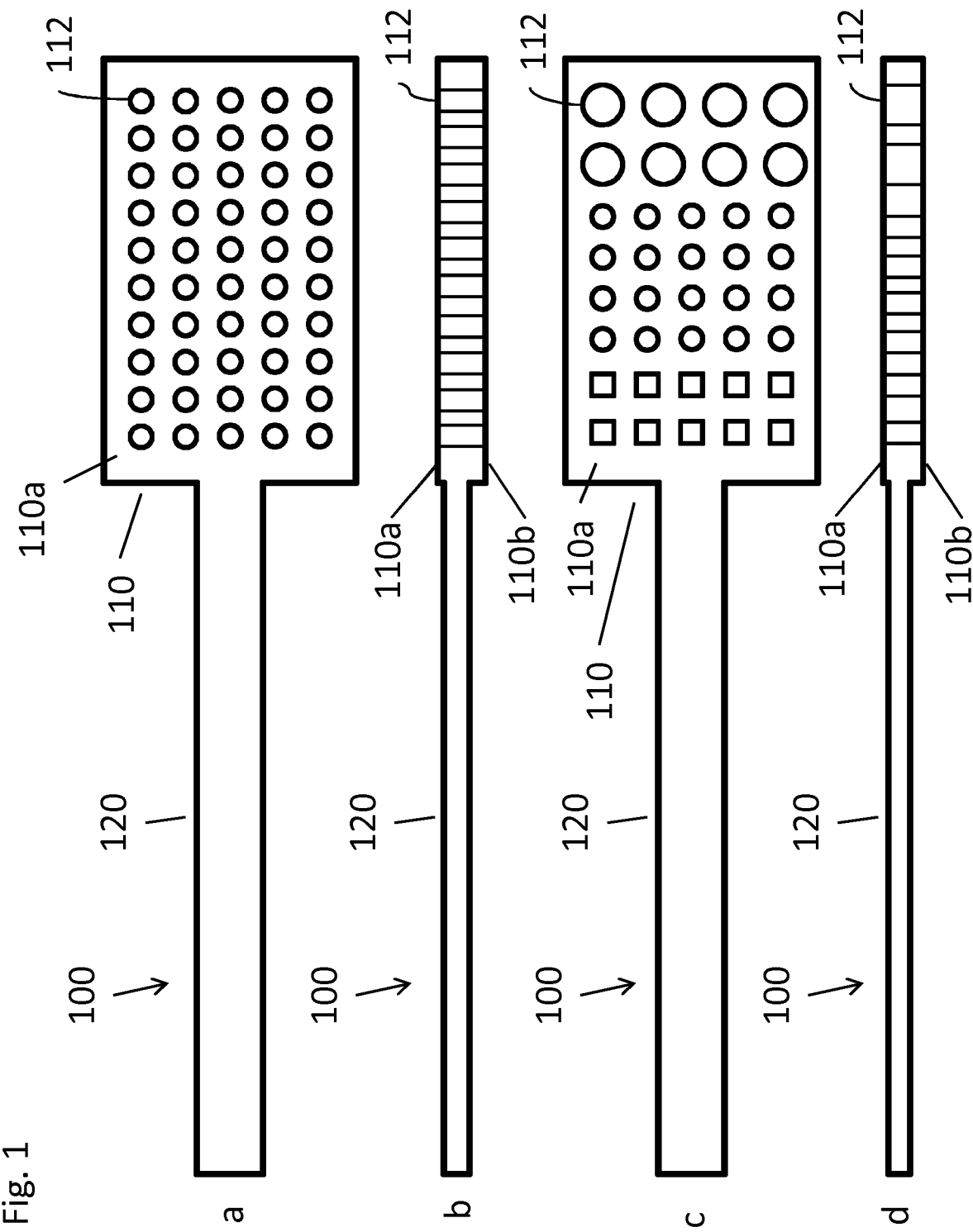
FIG. 1 depicts different views of a non-limiting configuration of a device according to the present disclosure.

Herein, the present inventors demonstrate the dipstick-based digitisation and detection of bacterial sample of concentration down to 1e3 CFU/ml. The significance of this work is that the present inventors demonstrate bacterial detection of concentrations relevant for urinary tract infection (UTI) with a minimal handling time and without the need for complicated external equipment.

The method and device according to the present disclosure enable the digitisation of liquid samples for statistical analysis.

The method and device according to the present disclosure can find application in diagnostics testing, as a tool in analytical chemistry, or for the detection and determination of concentration of bioreagents or pathogens.

The method and device according to the present disclosure includes arrays of sponge-like materials, including, but not restricted to, dried micro-gels.

The method and device according to the present disclosure contains arrays of capture zones for sampling liquid volumes between tens of microliters and femtolitres.

The amount of volume captured in every capture zone in the method and device according to the present disclosure is either entirely or in part determined by the geometry of that capture zone.

The method and device according to the present disclosure can be specifically adapted to perform digital bioassays.

The method and device according to the present disclosure can be specifically adapted to allow a simple operation, including the steps of dipping the device into a liquid sample and waiting some time to capture sample liquid inside the capture elements.

In one embodiment, the method relies on, and the device contains, hydrophilic surfaces inside the capture zones and hydrophobic or superhydrophobic surface surrounding the capture zones.

In one embodiment, the method relies on, and the device contains, air dried or freeze dried gel in the capture zones.

In one embodiment, the method relies on, and the device is adapted for, cleaning excess liquid from the surface of the device after sampling by a tissue, paper or sponge-like object. In one embodiment, such tissue, paper or sponge-like object has a lower capillary suction than the capture zones.

In one embodiment, the method relies on, and the device contains, a medium prepared by an emulsion of gel mixture with another immiscible liquid.

In one embodiment, the method relies on, and the device contains, a medium prepared by a foam of gel and a gas.

In one embodiment, the method relies on, and the device contains, a microporous gel structure inside some or all of the capture zones.

In one embodiment, the method relies on, and the device is adapted for, at least some of the capture zones containing bio-reagents, including broth, antibiotics or bioassay reagents. In one embodiment, such bioreagents can be stored on dried gel/After sampling, there is no need for further reagent addition for specific tests. In other words, such bioreagents can be stored on sponge-like microporous structure. Thus, there is no need for further reagent addition for specific test before or after sampling. In one embodiment the capture zones contain high surface-to-volume ratio matter. In yet one embodiment the capture zones contain high surface-to-volume ratio matter in the form of a gel. In yet one embodiment the capture zones contain high surface-to-volume ratio matter in the form of a gel that has porosity on different length scales, which can result in an improved mass transport inside the gel.

In one embodiment, the method relies on, and the device is adapted for, performing different types of chemical reactions in parallel, wherein one or several capture zones are prepared for one specific type of chemical reaction, and one or several other capture zones are prepared for another specific type of chemical reaction.

In one embodiment, the method relies on, and the device is adapted for, being photographed with a camera. In one embodiment, such camera is a cell phone or portable electronic device camera.

Throughout this text, the term "sponge-like material" is defined as a porous absorbent substance. Herein, the terms "sponge-like material" and "porous medium" have the same meaning and may be used interchangeably.

Throughout this text, the term "array" is intended to mean a group or a number of a certain component, e.g. a group or number of capture zones, a group or number of sponge-like materials, or a group or number of through-holes. For the purpose of the present disclosure, an array of capture zones or an array of sponge-like materials suitably comprises any number of capture zones, including from about 20 to about 10 000 000, such as 20, 50, 100, 150, 180, 200, 250, 300, 500, 1 000, 5 000, 10 000, 100 000, 1 000 000 or 10 000 000.

The figures illustrate various configurations of devices and parts thereof according to the present disclosure. It is to be understood that the figures are schematic drawings only; not necessarily showing correct ratios between the different elements. Further, a device according to the present disclosure can comprise any suitable number of capture zones. The number and configurations of capture zones and through-holes shown in each figure should not be construed as limiting the device to consist of the exact number and configuration of capture zones and through-holes shown. Further, although the corners of the device have been shown as straight corners in the figures herein, it is to be understood that the device could have one or more rounded corners instead. The figures should merely be seen as examples of how devices according to the present disclosure can be constructed.

FIG. 1 shows different views of non-limiting configurations of a device 100 according to the present disclosure. The device 100 is adapted for performing a bioassay, such as a digital bioassay, or for digitization of liquid samples for statistical analysis, for diagnostics testing or for detection and determination of concentration of bio-reagents or pathogens. More particularly, the device 100 comprises capture zones 112. It is to be understood that the number of capture zones 112 as well as the volume and shape of each capture zone may be varied depending for example on the intended application. Increasing the number of capture zones 112 increases the resolution of the bioassay. The total volume of all capture zones 112 decides the level of detection.

The capture zones 112 are adapted to hold sponge-like material 113 in which liquid sample may be retained. In a currently preferred embodiment, bio-reagents or pathogens contained in the liquid sample may be detected by inclusion of chromogenic agar in the capture zones 112. However, it is to be understood that detection may equally well be carried out by use of other detection reagents than chromogenic agar, such as by inclusion of a fluorescent reagent, an immunological reagent (e.g. an antibody) or an enzymatic reagent. Further, the device 100 may be adapted for performing different types of chemical reactions in parallel, wherein one or several capture zones are prepared for one specific type of chemical reaction, and one or several other capture zones are prepared for another type of specific chemical reaction etc, meaning that in addition one or several other capture zones may optionally be prepared for a third type of specific chemical reaction, and further optionally one or several other capture zones may be prepared for a fourth type of specific chemical reaction etc. In other words, each of the capture zones shall contain a means for achieving a detectable chemical reaction. In some embodiments, all capture zones contain a first type of detection means, such as one specific type of means for achieving a detectable chemical reaction. In other embodiments, one or several capture zones contain a first type of detection means, such as a first means for achieving a detectable chemical reaction, and one or several other capture zones contain a second type of detection means, such as a second means for achieving a detectable chemical reaction etc, meaning that in addition one or several other capture zones may optionally contain a third type of detection means, such as a third means for achieving a detectable chemical reaction, and further optionally one or several other capture zones may contain a fourth type of detection means, such as a fourth means for achieving a detectable chemical reaction etc.

FIG. 1a is a top view of a device 100 according to the present disclosure. The device 100 comprises a sampling part 110 and a grip part 120. The sampling part 110 has a first surface 110a (alternatively denoted top surface 110a), a second surface 110b (alternatively denoted a bottom surface 110b; not shown) which is parallel to the first surface 110a. The sampling part 110 further has four side surfaces (not shown) which connect the first surface 110a and the second surface 110b to each other. It is to be understood that the number of side surfaces may instead of four be three, five or a larger number. The sampling part 110 further comprises a plurality of capture zones 112. Each capture zone 112 comprises a sponge-like material 113 (not shown), which has the ability to absorb and retain liquid which is placed in contact with the sponge-like material 113.

The sampling part 110 may for example be 25 mm in one direction.

The grip part 120 is adapted to be gripped by a user during preparation (i.e. fabrication) and operation (i.e. use) of the device 100. It is to be understood that the grip part 120 can have any size and shape as long as it can be gripped or hold by a user such that the user can avoid touching the sampling part 110 of the device 100, thereby avoiding contamination of the sampling part 110. The grip part 120 can for example be configured as a handle.

FIG. 1b is a cross-sectional side view of the device 100. In the embodiment shown, the capture zones 112 extend through the sampling part 110 from the top surface 110a to the bottom surface 110b. In this embodiment, a capture zone 112 may thus alternatively be denoted by the term through-hole. Each capture zone 112 comprises a sponge-like material 113 (not shown in FIG. 1a, FIG. 1b), which has the ability to absorb and retain liquid which is placed in contact with the sponge-like material 113.

The device according to the present disclosure may comprise a dipstick in which an array of small through holes with well-defined volumes is created e.g. by laser drilling or molding.

FIGS. 1c and 1d shows an alternative, non-limiting embodiment of a device 100 according to the present disclosure. FIG. 1c is a top view and FIG. 1d is a cross-sectional side view of the device 100, which has capture zones 112 of different sizes and shapes.

Figure 2:
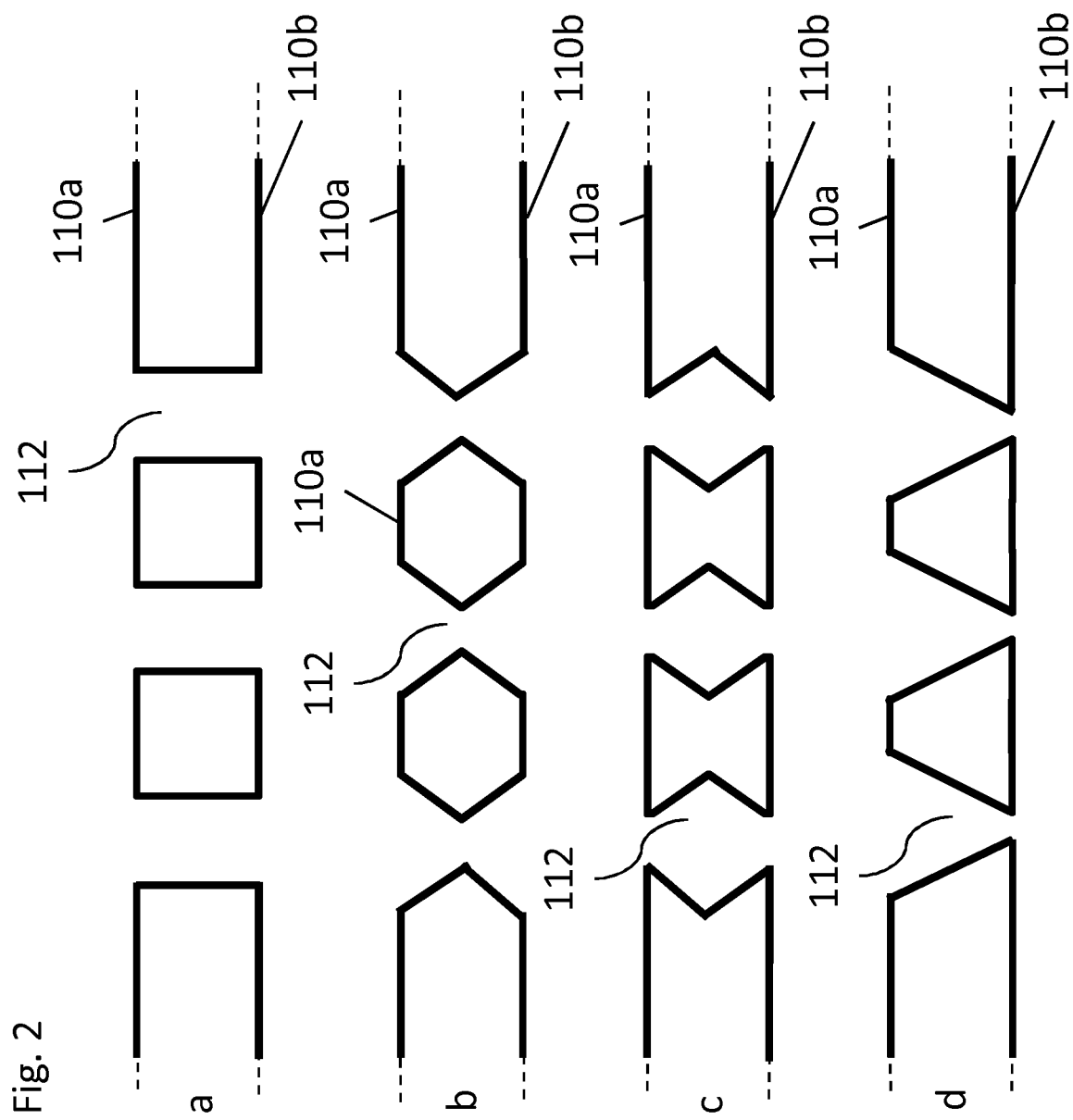
FIG. 2 shows different non-limiting configurations of the shape of capture zones present in a device according to the present disclosure.
Figure 3:
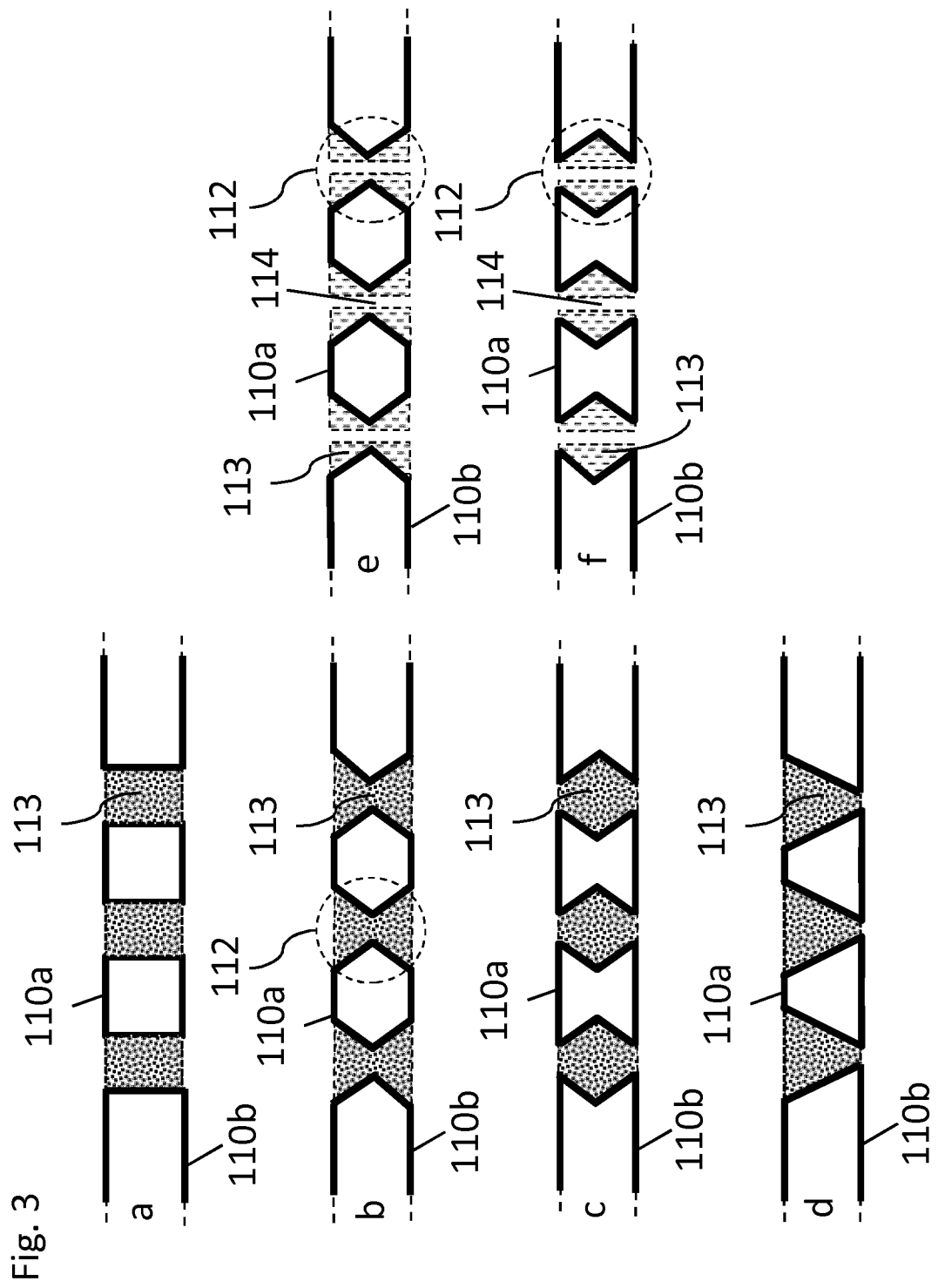
FIG. 3 shows different non-limiting configurations of the shape of capture zones comprising sponge-like material present in a device according to the present disclosure.

FIG. 2 depicts a number of non-limiting configurations of capture zones 112, which are through-holes extending between the top surface 110a and the bottom surface 110b of the device 100. FIG. 2a is a cross-sectional view showing capture zones 112 in which the maximum distance between any two points in the x-y plane is constant over the entire height or depth (i.e. in the z plane) of each capture zone. This embodiment includes a capture zone which has a cylindrical shape. In contrast, FIGS. 2b-2d show capture zones in which the maximum distance between any two points in the x-y plane varies over the height or depth of each capture zone (i.e in the z plane). More particularly, FIG. 2b shows an embodiment in which each of the capture zones is concave in the z plane and has a waist. FIG. 2c illustrates an embodiment in which each of the capture zones is convex. FIG. 2d depicts an embodiment in which each of the capture zones is tapered, such as each of the capture zones having a conical shape. It is to be understood that a device according to the present disclosure either may comprise a number of capture zones which all have the same cross-sectional shape or may comprise a number of captures zones, wherein one or several capture zones have a first cross-sectional shape, one or several other capture zones have a second cross-sectional shape, optionally one or several other capture zones have a third cross-sectional shape etc.

Figure 4:
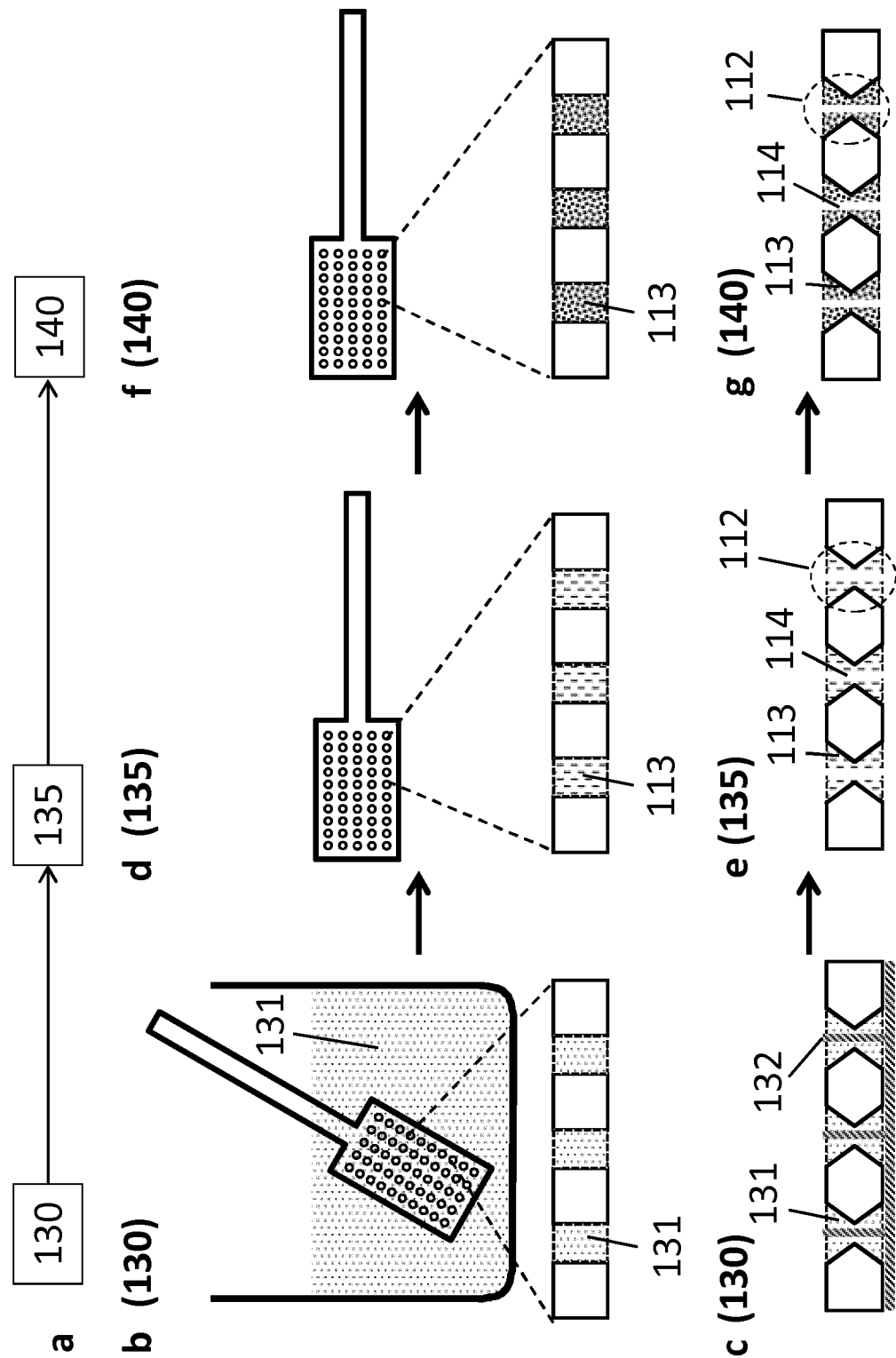
FIG. 4 illustrates methods for preparation of a device according to the present disclosure.

FIGS. 3a-3d correspond to FIGS. 2a-2d, and depicts various non-limiting configurations of capture zones 112 in the form of through-holes comprising a sponge-like material 113. FIGS. 3e and 3f show a particular embodiment, in which the sponge-like material 113 comprises a hollow microchannel 114. Such a microchannel 114 may for example be created by a mold, as shown in FIG. 4.

The device used in the following examples consists of a polymethyl methacrylate (PMMA) dipstick with an array of 180 holes of 200 nl or 800 nl volume fabricated by CO2 laser drilling. However, it is to be understood that other materials than PMMA may be used, as long as holes can be fabricated in the material and as long as the material is adapted to hold sponge-like material. As mentioned above, the number of holes and the volume and shape of each hole may be varied depending for example on the intended application. The holes in the dipstick may be created by drilling or molding.

In a currently preferred embodiment, the holes are through-holes with well-defined volume. For example, each through-hole may have a volume of 200 nl or 800 nl.

The maximum distance between any two points in a capture zone 112 of the device 100 according to the present disclosure is suitably a maximum of about 3 mm, such as 3.0 mm, 2.5 mm, 2.0 mm, 1.5 mm, 1.0 mm, or 500 µm.

Each of the capture zones 112 of the device 100 according to the present disclosure suitably has a depth of at least 0.1 mm, such as 0.5, 1, 1.5, 2.0, 2.5, 3.0 mm.

As mentioned above, the device according to the present disclosure contains arrays of capture zones for sampling liquid volumes between tens of microliters and femtolitres. In this context, it is to be understood that the total amount captured inside one capture zone may be limited to max ten microlitre. The total amount of liquid captured in all capture zones together may be several hundreds of microlitre.

When contacting the sampling part 110 of the device 100 with a liquid sample, the capture zones 112 in the sampling part 110 will be filled spontaneously with liquid due to capillary forces. When the sampling part 110 is removed from the liquid sample, the sponge-like material will retain liquid in the capture zones 112 by capillary force. The volume of liquid retained by the sponge-like material in each capture zone 112 can be easily isolated from the liquid retained in the surrounding capture zones, by making sure that the capture zones 112 are more hydrophilic than the surface surrounding the capture zones 112. In one embodiment, the device 100 has hydrophilic surfaces inside the capture zones 112 and hydrophobic or superhydrophobic surface surrounding the capture zones 112.

Figure 5:
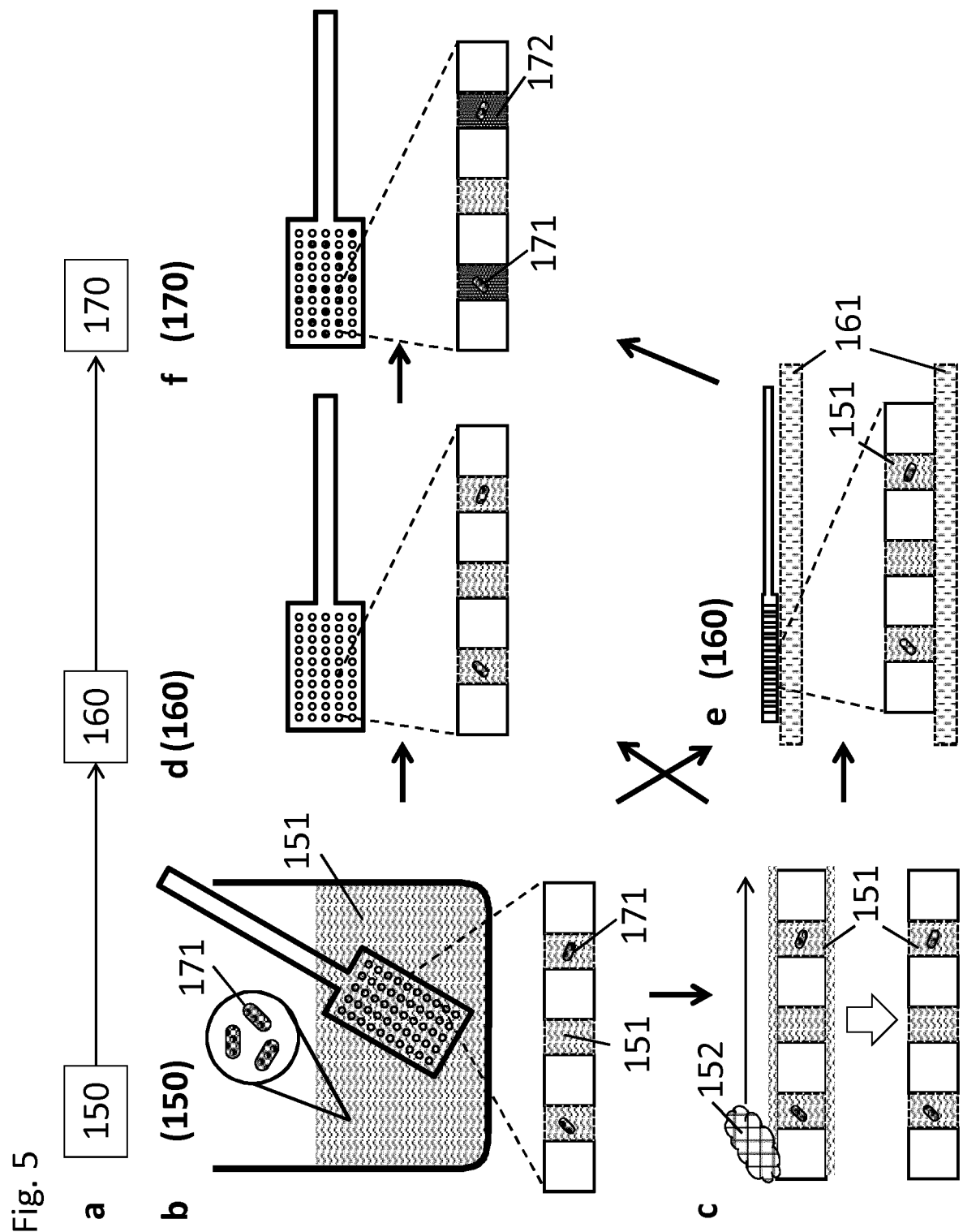
FIG. 5 illustrates methods for operation of a device according to the present disclosure.

FIG. 4 illustrates alternative methods for the preparation (i.e. fabrication) of a device according to the present disclosure and FIG. 5 depicts alternative methods for the operation (i.e. use) of a device according to the present disclosure.

In one embodiment, after forming capture zones (e.g. holes) in the device (e.g. a dipstick), the device is prepared in three main steps as follows (FIG. 4):
i) Filling (ref. no. 130 in FIGS. 4a, 4b, 4c): The device may be dipped in a medium (ref. no. 131 in FIG. 4b, FIG. 4c), e.g. a gel solution, such that the holes are filled (FIG. 4b.). According to non-limiting examples, the capture zones of the device are filled with a medium by dipping or any other suitable method, e.g. grafting, injection or printing. According to non-limiting examples, the medium may be gel precursor, agar in liquid form, chromogenic agar in liquid form, emulsion of gel mixture with another immiscible liquid, foam of gel and a gas, or mixture of any suitable gel. In a currently preferred embodiment (described in detail further below), the capture zones of the device are filled with chromogenic agar. It is to be understood that the device may be filled with other suitable gel solutions. In one non-limiting embodiment, the device can be filled while a removable mold (ref. no. 132 in FIG. 4c) is integrated with the device in order to structure microchannels 114 in each capture zone (FIG. 4c). Instead of the term "microchannel, alternative terms that may be used herein are "microhole" and "micropore".
ii) Gelation, cross linking or polymeriation (ref. no. 135 in FIGS. 4a, 4d, 4e): After filling, in-situ gelation of the medium, e.g. a hydrogel, occurs, or alternatively in-situ polymerization of the medium occurs (FIG. 4d). Gelation or polymerization may be achieved by ionotropic gelation, photopolymerization or simply melting in higher temperatures and cooling to form a gel. In one non-limiting embodiment, the gelation, cross-linking or polymerization occurs while a removable mold 132 is integrated with the device. Then the removable mold is removed in order to achieve sponge like material (ref. no. 113 in FIG. 4e) with microchannels (i.e. microholes/micropores) (ref. no. 114 in FIG. 4e) in each capture zone 112 (FIG. 4e).
iii) Drying (ref. no. 140 in FIGS. 4a, 4f, 4g): The device is dried (such as air-dried or freeze-dried), resulting in a dried sponge-like structure or dried sponge-like material (ref. no. 113 in FIGS. 4f, 4g) in each individual capture zone. The dried gel structure may alternatively be described as being a dried sponge-like gel, a dried micro-gel, or a microporous gel structure.

In one embodiment, operation of the device (e.g. a dipstick) requires three very simple and short steps as follows (FIG. 5):
i) Sampling (ref. no. 150 in FIGS. 5a, 5b): The device is placed in a liquid sample (ref. no. 151 in FIG. 5b) that contains analyte of interest (ref. no. 171 in FIG. 5b), e.g. bacteria, for a time period, such as including from about 1 second to 10 minutes, such as 1, 2, 3, 4, 5, 10, 20, 30, 40, or 50 seconds or 1, 2, 3, 4, 5, 6, 7, 8, 9, or 10 minutes, during which capture zones of the device are filled with sample (FIG. 5b). In a non-limiting embodiment, the device is preferably swiped with a tissue, paper or sponge-like object (ref. no. 152 in FIG. 5c) to remove excess liquid (i.e. sample) on the top and the bottom surface of the device but in which the gel retains the sample inside the capture zones (ref. no. 151 in FIG. 5c), i.e. liquid bridges between the holes are preferably removed (FIG. 5c) before evaluating the results. The gel retaining the sample during swiping is a key feature to achieve the improved function of the presently disclosed device compared to previously known devices. In a non-limiting embodiment, such tissue, paper or sponge-like object has a lower capillary suction than the capture zones. It is to be understood that excess liquid on the top and the bottom surfaces of the dipstick may alternatively be removed by other means than by swiping with a tissue, paper or sponge-like object, such as by applying heat to the device, which would make the liquid on the surfaces dry quicker than the liquid trapped in the holes or by squeezing out the liquid with a lid covering the capture zones, or by flowing an immiscible fluid over the capture zones which immiscible fluid replaces the sample present between the capture zones.

ii) Incubation (ref. no. 160 in FIGS. 5*a*, 5*d*, 5*e*): The device is incubated in relevant conditions (such as 37° C. humid chamber) for a time period, such as including from about 1 minute to about 48 hours, such as 1, 2, 5, 10, 20, 30, 40, 50 minutes or 1, 2, 3, 4, 5, 10, 15, 20, 25, 30, 35, 40, 45, 46, 47, 48 hours (FIG. 5*d*). In a non-limiting embodiment, wherein no bioassay reagent is already present in the capture zones, the device, e.g. dipstick, is mechanically placed in contact with wet gel surface (ref. no. 161 in FIG. 5*e*) (such as chromogenic agar) such that the reagents in the gel can diffuse into the capture zones (ref. no. 151 in FIG. 5*e*).

iii) Readout/count (ref. no. 170 in FIGS. 5*a*, 5*f*): After incubation, the capture zones that contain analyte of interest (ref. no. 171 in FIG. 5*f*), e.g. bacteria, are now radiating a specific readout signal (ref. no. 172 in FIG. 5*f*), e.g. colored in red, and the capture zones without analyte of interest are not radiating readout signal, e.g. are not coloured or have another colour. This allows a digital count by the naked eye or by taking an image of the device using a standard cell phone CMOS camera and using standard image processing techniques to get instant readout. Alternatively, detection may be made by use of any other suitable detection technique, such as fluorescence microscopy.

The following embodiment is a currently preferred, simplified method for the preparation (FIG. 4) and the operation (FIG. 5) of a device (e.g. a dipstick) according to the present disclosure.

After forming capture zones (e.g. holes, such as throughholes) in the device, the device is prepared in three steps as follows:

i) Filling (ref. no. 130 in FIGS. 4*a*, 4*b*, 4*c*): The device is dipped in a liquid or fluid medium (ref. no. 131 in FIGS. 4*b*, 4*c*) comprising chromogenic agar (Chromagar Orientation, Chromagar, France), e.g. chromogenic agar per se, or a hydrogel mixed with chromogenic agar, such that the capture zones are filled with the liquid or fluid medium. According to non-limiting examples, the capture zones of the device are filled with the liquid or fluid medium by dipping or any other suitable method, e.g. grafting, injection or printing. In a presently preferred embodiment, the capture zones of the device is filled with chromogenic agar at above 40° C., at which temperature the chromogenic agar is in liquid form. In another non-limiting embodiment, the capture zones of the device are filled with an alginate solution mixed with chromogenic agar. It is to be understood that the capture zones of the device may instead be filled with other suitable gel solutions mixed with chromogenic agar.

ii) Gelation, cross linking or polymeriation (ref. no. 135 in FIGS. 4*a*, 4*d*, 4*e*): After filling, in-situ gelation of the medium including chromogenic agar occurs, or alternatively in-situ polymerization of the medium occurs (FIG. 4*d*). Gelation or polymerization may be achieved by ionotropic gelation, photopolymerization or simply melting in higher temperatures and cooling to form a gel.

iii) Drying (ref. no. 140 in FIGS. 4*a*, 4*f*, 4*g*): The device is washed and freeze-dried, resulting in a dried sponge-like structure including chromogenic agar in each individual capture zone. When freeze-dried, chromogenic agar obtains the desirable sponge-like texture, which enables capturing and retaining of sample during use of the device. The dried sponge-like structure may alternatively be described as being a dried sponge-like material, a dried sponge-like gel, a dried micro-gel, or a microporous gel structure.

Operation of the device according to the currently preferred, simplified method requires three very simple and short steps as follows (FIG. 5):

Sampling (ref. no. 150 in FIGS. 5*a*, 5*b*): The device is placed in a liquid sample, e.g. a bacterial sample, for a time period, such as including from about 1 second to about 10 minutes, such as 1, 2, 3, 4, 5, 10, 20, 30, 40, or 50 seconds or 1, 2, 3, 4, 5, 6, 7, 8, 9, or 10 minutes, during which the capture zones are filled with sample (FIG. 5*b*). In a non-limiting embodiment, the device is preferably swiped with a tissue, paper or sponge-like object (ref. no. 152 in FIG. 5*c*) to remove excess liquid (i.e. sample) on the top and the bottom surface of the device, e.g. dipstick, but in which the gel retains the sample inside the capture zones (ref. no. 151 in FIG. 5*c*), i.e. liquid bridges between the holes are preferably removed (FIG. 5*c*) before evaluating the results. The freeze-dried chromogenic agar or gel retaining the sample during swiping is a key feature to achieve the improved function of the presently disclosed device compared to previously known devices. In a non-limiting embodiment, such tissue, paper or sponge-like object has a lower capillary suction than the capture zones. It is to be understood that excess liquid on the top and the bottom surfaces of the device may alternatively be removed by other means than by swiping with a tissue, paper or sponge-like object, such as by applying heat to the device, which would make the liquid on the surfaces dry quicker than the liquid trapped in the holes, or by squeezing out the liquid with a lid covering the capture zones, or by flowing an immiscible fluid over the capture zones which immiscible fluid replaces the sample present between the capture zones.

ii) Incubation (ref. no. 160 in FIGS. 5*a*, 5*d*, 5*e*): The device is incubated in relevant conditions (such as 37° C. humid chamber) for a time period, such as including from about 1 minute to about 48 hours, such as 1, 2, 5, 10, 20, 30, 40, 50 minutes or 1, 2, 3, 4, 5, 10, 15, 20, 25, 30, 35, 40, 45, 46, 47, 48 hours (FIG. 5*d*).

iii) After incubation, the capture zones that contain analyte of interest, e.g. bacteria, are now in one colour and the capture zones without analyte of interest are not coloured or have another colour. This allows a digital count by the naked eye or by taking an image of the device using a cell phone CMOS camera and using image processing techniques to get instant readout. Alternatively, detection may be made by use of any other suitable detection technique, such as fluorescence microscopy.

The above-described, currently preferred method for preparation and operation allows simple and fast preparation and operation of the device according to the present disclosure.

The present disclosure is directed to a device (100) comprising a sampling part (110), wherein the sampling part (110) comprises an array of capture zones (112) for sampling liquid volumes between tens of microliters and femtoliters, wherein some or all of the capture zones (112) contain a sponge-like material.

In one embodiment, the capture zones (112) have well-defined volumes.

In one embodiment, the maximum distance between any two points in a capture zone (112) is 3 mm, such as 2.5 mm, 2.0 mm, 1.5 mm, 1.0 mm, or 500 µm.

In one embodiment, each of the capture zones (112) has a depth of at least 0.1 mm, such as 0.5, 1, 1.5, 2.0, 2.5, 3.0 mm.

In one embodiment, the sponge-like material is a porous medium, freeze-dried chromogenic agar, a freeze-dried medium comprising chromogenic agar, a dried sponge-like gel, a dried micro-gel, a microporous gel structure, or a microporous gel structure comprising one or more microchannels.

In one embodiment, the sampling part (110) comprises a body (111) which has a first surface (111a), a second surface (111b), and wherein each capture zone (112) extends between the first surface (111a) and the second surface (111b) of the body (111), such that each capture zone (112) is a through-hole.

In one embodiment, the surface of the capture zones (112) is more hydrophilic than the surface surrounding the capture zones (112).

In one embodiment, the device has hydrophilic surfaces inside the capture zones and hydrophobic or superhydrophobic surface surrounding the capture zones.

In one embodiment, at least some of the capture zones contains at least one chemical reagent or bio-reagent, including broth, an antibiotic or a bioassay reagent.

In one embodiment, the sponge-like material has porosity on different length scales.

In one embodiment, one or several capture zones are prepared for one specific type of chemical or biological reaction, and one or several other capture zones are prepared for another specific type of chemical or biological reaction.

In one embodiment, the device is for performing a bioassay, such as a digital bioassay, and/or wherein the device is for digitization of liquid samples for statistical analysis, and/or wherein the device is for diagnostics testing or for detection and determination of a presence, concentration and/or properties of an analyte, which is a chemical substance or a biological substance, such as a bio-reagent, or a living organism, such as a pathogen, a virus, or a bacterium.

In one embodiment, the device is adapted for the easy separation of individual capture zones or their content from the device. For example, the content may be pushed out from the capture zone or a whole capture zone may be separated by a puncher-like device.

In one embodiment, some or all of the through-holes are cylindrical, some or all of the through-holes are tapered, some or all of the through-holes have a waist, some or all of the through-holes are convex, and/or some or all of the through-holes are concave.

In one embodiment, the device is a dipstick.

In one embodiment, the device is a dipstick comprising an array of through-holes with well-defined volume, wherein the through-holes comprise sponge-like material, e.g. wherein the sponge-like material is a porous medium, freeze-dried chromogenic agar, a freeze-dried medium comprising chromogenic agar, a dried sponge-like gel, a dried micro-gel, a microporous gel structure, or a microporous gel structure comprising one or more microchannels.

The present disclosure is further directed to a method for the preparation of a device according to any one of the above described embodiments, comprising:

(i) providing a device (100) comprising a sampling part (110), wherein the sampling part (110) comprises an array of capture zones (112) for sampling liquid volumes between tens of microliters and femtoliters;

(ii) synthesizing a sponge-like material in at least one of the capture zones (112).

In one embodiment of the method for the preparation of a device, step (ii) comprises dipping the device (100) in a medium, such as a gel solution, thereby filling the capture zones (112) with the medium, followed by gelation or polymerization of the medium in the capture zones, optionally washing the device (100), and drying the device (100), thereby drying the medium to a sponge-like material.

In one embodiment of the method for the preparation of a device, the method further comprises providing a chemical reagent or bio-reagent, including broth, an antibiotic or a bioassay reagent to at least some of the capture zones.

The present disclosure is also directed to a method for the detection and determination of the presence, concentration and/or properties of an analyte, which is a chemical substance or a biological substance, such as a bio-reagent, or a living organism, such as a pathogen, a virus, or a bacterium, comprising:

(i) contacting a liquid sample with a device according to any one of the above-described embodiments;

(ii) measuring or detecting the presence, concentration and/or properties of the analyte present in the liquid sample.

In one embodiment of the method for the detection and determination of the presence, concentration and/or properties of an analyte, step (i) comprises dipping the device into a liquid sample and waiting some time to capture sample liquid inside the capture zones.

In one embodiment of the method for the detection and determination of the presence, concentration and/or properties of an analyte, the method further comprises cleaning excess liquid from the device region surrounding the capture zones, such as the surface of the device after sampling by a tissue, paper, sponge-like object or fluid flow between step (i) and step (ii), preferably wherein such tissue, paper or sponge-like object has a lower capillary suction than the capture zones.

In one embodiment of the method for the detection and determination of the presence, concentration and/or properties of an analyte, step (ii) comprises measuring or detecting the presence, concentration and/or properties of the analyte by digital count by the naked eye, by taking an image of the device using a camera and using image processing techniques to get instant readout, or by fluorescence detection.

In one embodiment of the method for the detection and determination of the presence, concentration and/or properties of an analyte, the method is used for in vitro diagnostic testing of a urinary tract infection in an individual, which diagnostic testing includes pathogen quantification and/or antibiotic susceptibility testing.

The present disclosure is further directed to use of a device according to any one of the above-described embodiments for detection and determination of a presence, concentration and/or properties of an analyte, which is a chemical substance or a biological substance, such as a bio-reagent, or a living organism, such as a pathogen, a virus, or a bacterium.

The present disclosure is also directed to use of a device according to any one of the above-described embodiments for performing the method for the detection and determination of the presence, concentration and/or properties of an analyte according to any one of the above-described embodiments.

EXAMPLES

Example 1

Our novel device consists of a dipstick in which an array of small through holes with well-defined volumes is created by laser drilling or molding. For example, a polymethyl methacrylate (PMMA) dipstick with an array of 180 holes of 200 nl volume fabricated by $CO_2$ laser drilling.

The dipsticks are prepared in two steps:
i) The device is dipped in gel solution such that the holes are filled. After filling, in-situ gelation of hydrogel occurs.
ii) The device is washed and dried, resulting in a dried gel structure in each individual hole.

Operation of the dipstick requires three very simple and short steps:
i) The dipstick is placed in bacterial sample for 1 minute, during which the dipstick holes are filled with sample (FIG. 2). Thereafter, the dipstick is swiped with a tissue to remove excess sample on the top and the bottom surface of the dipstick, but in which the gel retains the sample inside the holes.
ii) The dipstick is placed on a chromogenic agar (Chromagar Orientation, Chromagar, France) surface for 12 hours incubation.
iii) After 12 hours, the dipstick holes that contained bacteria colour red and the holes without bacteria remain uncoloured, which allows a digital count with the naked eye. Results can be read by naked eye or simply with taking an image of the dipstick using a standard cell phone CMOS camera and using standard image processing techniques to get instant readout.

Figure 6:
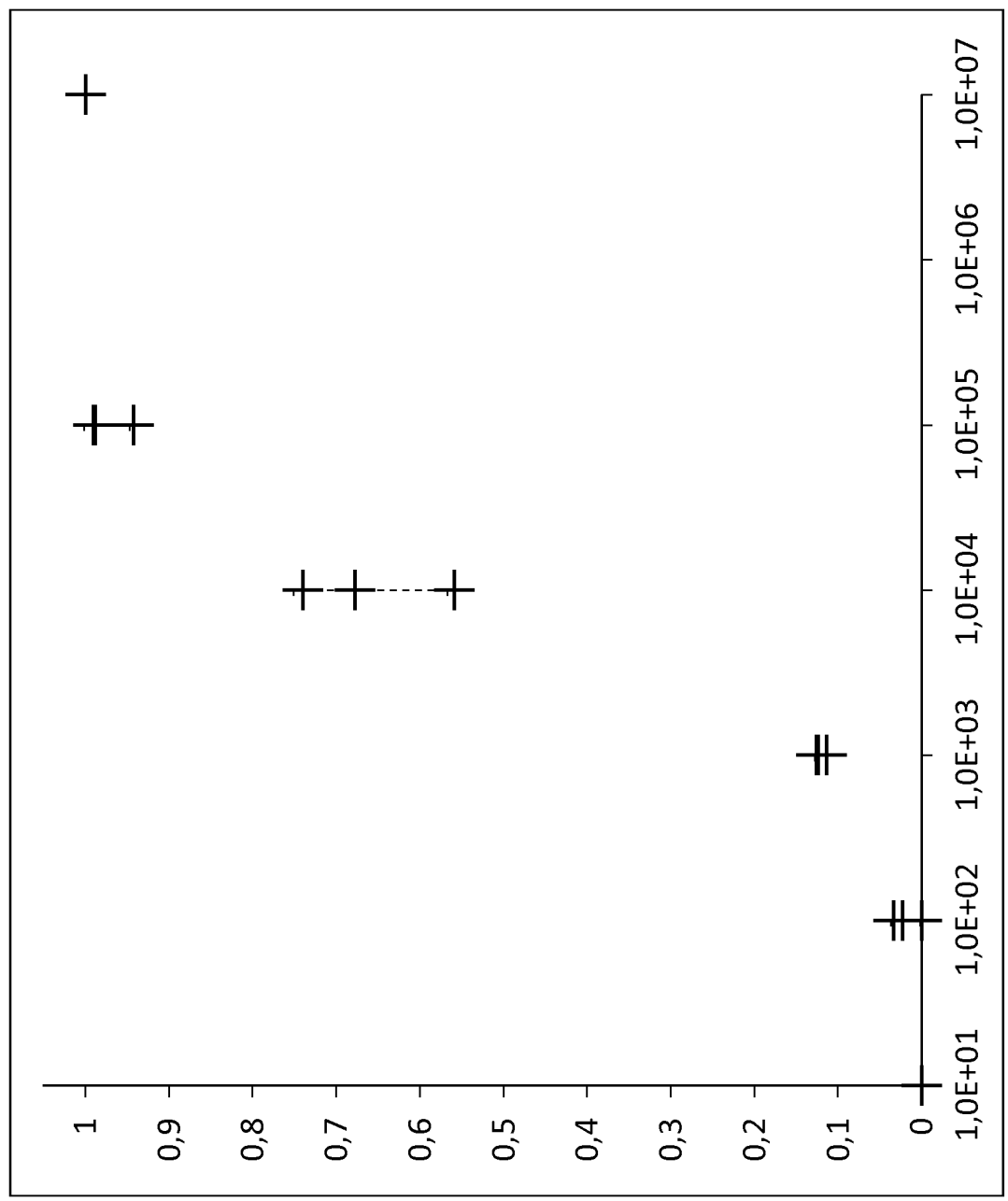
FIG. 6 is a graph showing results of triplicate experiments with a device according to the present disclosure, wherein the graph depicts *E. coli* concentration in CFU/ml (x-axis) vs. positive hole fraction (y-axis).

Triplicate assays on *E. coli* in broth concentrations of 0 CFU/ml, $10^3$ CFU/ml, $10^4$ CFU/ml, $10^5$ CFU/ml, $10^7$ CFU/ml were performed. For the control measurement (0 CFU/ml) no coloured holes were found. For all other concentrations, coloured holes were found. The results of coloured hole fractions are plotted in FIG. 6.

Example 2

Dipstick preparation: Our novel device consists of a dipstick, in which we create (by drilling or molding) an array of small through-holes with well-defined volume. We fabricated dipstick hole arrays of 180 holes with volume 800 nL. The holes are filled with a hydrogel/toluene emulsion, after which the hydrogel is cross-linked, the toluene is replaced by IPA, the IPA is evaporated, and the gel is dried, resulting in a microporous dry gel structure in each of the holes.

Dipstick operation in four simple and short steps: The dipstick is i) placed in the bacterial sample for 1 minute, during which the dipstick holes fill with sample. ii) The dipstick is swiped dry on a tissue to remove the excess sample on the top and bottom surface of the dipstick, but in which the sample inside the holes is retained by the gel. The gel retaining the sample during swiping is the main "microfluidic" innovation. iii) Thereafter the stick is placed on a chromogenic agar (Chromagar Orientation, Chromagar, France) surface for 12 h. iv) After 12 h incubation, dipstick holes that contained bacteria colour red and holes without bacteria remain uncoloured, which allows a digital count with the naked eye.

Results: We performed triplicate assays on *E. coli* in broth concentrations of 0, 1e3, 1e4, 1e5 and 1e7 CFU/mL. For the control measurement (0 CFU/mL), we found no coloured holes. For all other concentrations, we found coloured holes and the results are plotted in FIG. 2. We are currently testing 1e1 and 1e2 concentrations to be able to determine the LoD. Next step: In a next step, the chromogenic agar can be mixed with the hydrogel during device preparation, removing the need for agar surfaces during incubation.

Example 3

Our novel device consists of a dipstick in which an array of small through holes (capture zones) with well-defined volumes is created by laser drilling or molding. For example, a polymethyl methacrylate (PMMA) dipstick with an array of 180 holes of 200 nl volume fabricated by $CO_2$ laser drilling.

The dipsticks are prepared in three steps:
i) The device is filled with chromogenic agar (Chromagar Orientation, Chromagar, France) at 50° C., at which temperature the chromogenic agar is in liquid form.
ii) After filling, device is cooled down to room temperature to form a gel in each hole.
iii) The device is freeze dried, resulting in a microporous dried gel structure which contains bioassay reagents in each individual hole.

Operation of the dipstick requires three very simple and short steps:
i) The dipstick is placed in bacterial sample (*E. coli* in broth) for 1 minute, during which the dipstick holes are filled with sample. Thereafter, the dipstick is swiped with a tissue to remove excess sample on the top and the bottom surface of the dipstick, but in which the gel retains the sample inside the holes.
ii) The dipstick is placed in a 37° C. humid chamber for 12 hours of incubation.
iii) After 12 hours, the dipstick holes that contained bacteria colour red and the holes without bacteria remain uncoloured, which allows a digital count with the naked eye.

Example 4

Our novel device consists of a dipstick in which an array of small through holes (capture zones) with well-defined volumes is created by laser drilling or molding. For example, a polymethyl methacrylate (PMMA) dipstick with an array of 180 holes with the shape shown in FIG. 2b and the volume of 800 nl fabricated by $CO_2$ laser drilling from both sides of the 1 mm thick PMMA sheet.

The dipsticks are prepared in two steps:
i) The device is integrated with the removable aluminium mold containing 200 um wide cylindrical pillars fits through each drilled hole, like shown in FIG. 4c. Then, dipstick is filled with chromogenic agar (Chromagar Orientation, Chromagar, France) at 50° C., at which temperature the chromogenic agar is in liquid form.
ii) After filling, device is cooled down to room temperature to form a gel in each capture zone. Then, aluminium mold is removed, resulting in each capture zone containing chromogenic agar gel with through hole inside. Since these capture zones already contain sponge like material which can sample liquid in structured microholes in agar, there is no need for further drying/freeze drying.

Operation of the dipstick requires three very simple and short steps:
i) The dipstick is placed in bacterial sample (*E. coli* in broth) for 5 seconds, during which the microstructured holes are filled with sample. Thereafter, excess sample on the top and the bottom surface of the dipstick is removed by squeezing out the liquid with a lid covering the surfaces.

ii) The dipstick is placed in a 37° C. humid chamber for 8 hours of incubation.

iii) After 12 hours, the dipstick holes that contained bacteria colour red and the holes without bacteria remain uncoloured, which allows a digital count with the naked eye.

It is to be understood that the present disclosure is not restricted to the above-described exemplifying embodiments thereof and that several conceivable modifications of the present disclosure are possible within the scope of the following claims. Further, any reference signs present in the claims should not be seen as limiting the extent of the matter protected by the claims; the sole function of such reference signs is to make the claims easier to understand.

REFERENCES

[1] Laxminarayan, Ramanan, et al. "Antibiotic resistance—the need for global solutions." *The Lancet infectious diseases* 13.12 (2013): 1057-1098.

[2] J. O'Neill, Tackling drug-resistant infections globally: Final report and recommendations (2016); https://amr-review.org/Publications.html.

[3] Barber, Amelia E., et al. "Urinary tract infections: current and emerging management strategies." *Clinical infectious diseases* 57.5 (2013): 719-724.

[4] Whitesides, George M. "The origins and the future of microfluidics." *Nature* 442.7101 (2006): 368-373.

[5] Sia, Samuel K., and Larry J. Kricka. "Microfluidics and point-of-care testing." *Lab on a Chip* 8.12 (2008): 1982-1983.

[6] Guo, Mira T., et al. "Droplet microfluidics for high-throughput biological assays." *Lab on a Chip* 12.12 (2012): 2146-2155.

[7] Ueda, Erica, et al. "DropletMicroarray: facile formation of arrays of microdroplets and hydrogel micropads for cell screening applications." *Lab on a Chip* 12.24 (2012): 5218-5224.

[8] Pardon, Gaspard, Tommy Haraldsson, and Wouter van der Wijngaart. "Simultaneous Replication of Hydrophilic and Superhydrophobic Micropatterns through Area-Selective Monomers Self-Assembly." *Advanced Materials Interfaces, vol.* 3, no. 17, 2016.

[9] Yasuga, H., and N. Miki. "Imbibed immiscible solvent splits aqueous solution into a two-dimensional droplet array without precise pipetting or pumping." *20th International Conference on Miniaturized Systems for Chemistry and Life Sciences, MicroTAS* 2016. Chemical and Biological Microsystems Society, 2016.

[10] Yasuga, Hiroki, et al. "Droplet Microfluidics Inside Paper." *Proc. IEEE 31th International Conference on Micro Electro Mechanical Systems (MEMS),* 2018.

[11] Reis, Nuno M., et al. "Lab on a stick: multi-analyte cellular assays in a microfluidic dipstick." *Lab on a Chip* 16.15 (2016): 2891-2899.

[12] Du, Wenbin, et al. "SlipChip." *Lab on a Chip* 9.16 (2009): 2286-2292.

[13] Schoepp, Nathan G., et al. "Rapid pathogen-specific phenotypic antibiotic susceptibility testing using digital LAMP quantification in clinical samples." *Science Translational Medicine* 9.410 (2017): eaal3693.

[14] Ducrée, Jens, et al. "The centrifugal microfluidic Bio-Disk platform." *Journal of Micromechanics and Microengineering* 17.7 (2007): S103.

[15] Ramachandraiah, Harisha, et al. "Lab-on-DVD: standard DVD drives as a novel laser scanning microscope for image based point of care diagnostics." *Lab on a Chip* 13.8 (2013): 1578-1585.

[16] Wilson, Michael L., and Loretta Gaido. "Laboratory diagnosis of urinary tract infections in adult patients." *Clinical infectious diseases* 38.8 (2004): 1150-1158.

The invention claimed is:

1. A dipstick for analyzing a liquid sample, comprising:
   (a) a sampling part that comprises at least 20 through-holes, wherein the through-holes extend from a top surface of the sampling part to a bottom surface of the sampling part,
   (b) a handle that is connected to the sampling part; and
   (c) a porous material that comprises detection reagents, wherein the porous material is present in the through-holes of the sampling part and each through-hole comprises a channel that is distinct from the porous material and extends from one end of the through-hole to the other.

2. The dipstick according to claim 1, wherein a maximum distance between any two points in a through-hole is 3 mm.

3. The dipstick according to claim 1, wherein each of the through-holes has a depth of at least 0.1 mm.

4. The dipstick according to claim 1, wherein the porous material comprises a porous medium, freeze-dried chromogenic agar, a freeze-dried medium comprising chromogenic agar, a dried sponge-like gel, a dried micro-gel, a microporous gel, or a microporous gel.

5. The dipstick according to claim 1, wherein a surface of the through-holes is more hydrophilic than a surface surrounding the through-holes.

6. The dipstick according to claim 1, which has hydrophilic surfaces inside the through-holes and hydrophobic or superhydrophobic surface surrounding the through-holes.

7. The dipstick according to claim 1, wherein at least some of the through-holes contain at least one detection reagent that is a chemical reagent or a bio-reagent.

8. The dipstick of claim 7, wherein said at least one chemical reagent or bio-reagent is selected from the group consisting of a broth, an antibiotic and a bioassay reagent.

9. The dipstick according to claim 1, wherein the porous material has porosity on different length scales.

10. The dipstick according to claim 1, wherein one or several through-holes are prepared for one specific type of chemical or biological reaction, and one or several other through-holes are prepared for another specific type of chemical or biological reaction.

11. The dipstick according to claim 1, wherein the device is adapted for the easy separation of individual through-holes or their content from the device.

12. The dipstick according to claim 1, wherein some or all of the through-holes are cylindrical, some or all of the through-holes are tapered, some or all of the through-holes have a waist, some or all of the through-holes are convex, and/or some or all of the through-holes are concave.

13. The dipstick of claim 1, wherein each through-hole has a volume of up to 10 microliters.

14. The dipstick of claim 1, wherein the channel is molded into the porous material.

15. A method for the preparation of a device according to claim 1, comprising:
   (i) providing a device comprising a sampling part, wherein the sampling part comprises an array of through-holes; and
   (ii) synthesizing a porous material in at least one of the through-holes, wherein each through-hole comprises a channel that is distinct from the porous material and extends from one end of the through-hole to the other.

16. The method according to claim 15, wherein step (ii) comprises dipping the device in a medium, such as a gel solution, thereby filling the capture zones with the medium, followed by gelation or polymerization of the medium in the through-holes, optionally washing the device, and drying the device, thereby drying the medium to a porous material.

17. The method according to claim 15, further comprising providing a chemical reagent or bio-reagent, including broth, an antibiotic or a bioassay reagent to at least some of the through-holes.

18. A method for the detection and determination of the presence, concentration and/or properties of an analyte, which is a chemical substance or a biological substance, or a living organism, comprising:
(i) contacting a liquid sample with a device according to claim 1;
(ii) measuring or detecting the presence, concentration and/or properties of the analyte present in the liquid sample.

19. The method according to claim 18, wherein step (i) comprises dipping the device into a liquid sample and waiting some time to capture sample liquid inside the through-holes.

20. The method according to claim 18, further comprising cleaning any excess liquid from the device region surrounding the through-holes after dipping.

21. The method according to claim 18, wherein step (ii) comprises measuring or detecting the presence, concentration and/or properties of the analyte by digital count by the naked eye, by taking an image of the device using a camera and using image processing techniques to get instant readout, or by fluorescence detection.

22. The method according to claim 18, wherein the method is used for in vitro diagnostic testing of a urinary tract infection in an individual, which diagnostic testing includes pathogen quantification and/or antibiotic susceptibility testing.

* * * * *